(12) United States Patent
Nguyen et al.

(10) Patent No.: US 10,499,413 B2
(45) Date of Patent: Dec. 3, 2019

(54) WIRELESS DATA PRIORITY SERVICES

(71) Applicant: AltioStar Networks, Inc., Tewksbury, MA (US)

(72) Inventors: Si Nguyen, Winchester, MA (US); Shabbir A. Bagasrawala, Lexington, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 186 days.

(21) Appl. No.: 15/483,068

(22) Filed: Apr. 10, 2017

(65) Prior Publication Data

US 2017/0295591 A1    Oct. 12, 2017

Related U.S. Application Data

(60) Provisional application No. 62/320,161, filed on Apr. 8, 2016.

(51) Int. Cl.
*H04W 72/12* (2009.01)
*H04W 28/08* (2009.01)
(Continued)

(52) U.S. Cl.
CPC ....... *H04W 72/1247* (2013.01); *H04W 28/08* (2013.01); *H04W 72/1257* (2013.01); *H04W 16/32* (2013.01); *H04W 88/085* (2013.01)

(58) Field of Classification Search
CPC ... H04W 88/02; H04W 88/08; H04W 88/085; H04W 72/02; H04W 72/10; H04W 72/12;
(Continued)

(56) References Cited

U.S. PATENT DOCUMENTS 5,923,650 A * 7/1999 Chen .................. H04L 47/10
370/331
8,531,947 B2    9/2013 Zhao et al.
(Continued)

FOREIGN PATENT DOCUMENTS

CN    101379839 A    3/2009
CN    102396262 A    3/2012
(Continued)

OTHER PUBLICATIONS

International Search Report and Written Opinion for Application No. PCT/US2017/026793 dated Aug. 18, 2017.
(Continued)

*Primary Examiner* — Peter Chen
(74) *Attorney, Agent, or Firm* — Mintz Levin Cohn Ferris Glovsky and Popeo, P.C.

(57) ABSTRACT

A system, an apparatus, a method and a computer program product for transmission of data packets using wireless data priority services in wireless communications system. A priority level for a user equipment is determined. Based on the determined priority level for the user equipment, an admission control procedure to reserve transmission capacity for the user equipment is executed. Based on the determined priority level for the user equipment and the reserved transmission capacity, at least one data packet for transmission to and/or from the user equipment is scheduled. Based on the scheduling, the data packet is transmitted.

30 Claims, 14 Drawing Sheets

(51) Int. Cl.
*H04W 16/32* (2009.01)
*H04W 88/08* (2009.01)

(58) Field of Classification Search
CPC ............ H04W 72/082; H04W 72/042; H04W 72/1242; H04W 72/1247; H04W 72/1257; H04W 16/32; H04W 28/08; H04W 36/28
See application file for complete search history.

(56) References Cited

U.S. PATENT DOCUMENTS

| | | |
|---|---|---|
| 8,804,744 B2 | 8/2014 | Gao et al. |
| 9,288,823 B2 | 3/2016 | Lei et al. |
| 9,439,095 B2 | 9/2016 | He et al. |
| 9,504,029 B2 | 11/2016 | Yang et al. |
| 9,788,307 B2 | 10/2017 | Yang et al. |
| 9,813,219 B2 | 11/2017 | Yang et al. |
| 10,009,803 B2 | 6/2018 | Dahod et al. |
| 2002/0172178 A1 | 11/2002 | Suzuki et al. |
| 2003/0235171 A1 | 12/2003 | Lundstrom et al. |
| 2009/0201813 A1 | 8/2009 | Speight |
| 2009/0219951 A1 | 9/2009 | Chun et al. |
| 2009/0252148 A1 | 10/2009 | Dolganow et al. |
| 2010/0054231 A1 | 3/2010 | Dolganow et al. |
| 2010/0062781 A1 | 3/2010 | Dolganow et al. |
| 2010/0067489 A1 | 3/2010 | Pelletier et al. |
| 2010/0113000 A1 | 5/2010 | Yao |
| 2010/0260096 A1 | 10/2010 | Ulupinar et al. |
| 2010/0260097 A1 | 10/2010 | Ulupinar et al. |
| 2011/0034175 A1 | 2/2011 | Fong et al. |
| 2011/0242975 A1 | 10/2011 | Zhao et al. |
| 2011/0267951 A1 | 11/2011 | Stanwood et al. |
| 2011/0310839 A1 | 12/2011 | Kenington et al. |
| 2012/0163298 A1 | 6/2012 | Zhou et al. |
| 2012/0188953 A1 | 7/2012 | Won et al. |
| 2012/0230248 A1 | 9/2012 | Gao et al. |
| 2012/0257581 A1 | 10/2012 | De |
| 2012/0263120 A1* | 10/2012 | Gopalakrishnan .......................... H04W 72/1226 370/329 |
| 2012/0300710 A1 | 11/2012 | Li et al. |
| 2012/0300747 A1 | 11/2012 | Westberg et al. |
| 2013/0051329 A1 | 2/2013 | Take |
| 2013/0083730 A1 | 4/2013 | Gaal et al. |
| 2013/0163524 A1 | 6/2013 | Shatzkamer et al. |
| 2013/0188619 A1 | 7/2013 | Dinan |
| 2013/0201890 A1 | 8/2013 | Swaminathan et al. |
| 2013/0223272 A1 | 8/2013 | Tao et al. |
| 2013/0272181 A1 | 10/2013 | Fong et al. |
| 2013/0301609 A1 | 11/2013 | Smith et al. |
| 2014/0010125 A1 | 1/2014 | Tillman et al. |
| 2014/0018090 A1 | 1/2014 | Khoryaev et al. |
| 2014/0029458 A1 | 1/2014 | Ye |
| 2014/0043980 A1 | 2/2014 | Anthony et al. |
| 2014/0120936 A1* | 5/2014 | Chen ..................... H04W 48/06 455/452.1 |
| 2014/0120947 A1 | 5/2014 | Siomina |
| 2014/0204895 A1 | 7/2014 | Frederiksen et al. |
| 2014/0226481 A1* | 8/2014 | Dahod .................. H04W 72/04 370/235 |
| 2014/0233413 A1 | 8/2014 | Dahod et al. |
| 2014/0233459 A1 | 8/2014 | Dahod et al. |
| 2014/0233479 A1 | 8/2014 | Dahod et al. |
| 2015/0009923 A1 | 1/2015 | Lei et al. |
| 2015/0312904 A1 | 10/2015 | Ma et al. |
| 2015/0326456 A1 | 11/2015 | Dudda et al. |
| 2015/0327236 A1 | 11/2015 | Lin |
| 2015/0341923 A1 | 11/2015 | Yang et al. |
| 2016/0057768 A1* | 2/2016 | Sun ..................... H04W 72/046 370/330 |
| 2016/0182286 A1* | 6/2016 | Lunden .................. H04W 4/02 370/254 |
| 2016/0353430 A1 | 12/2016 | Chen et al. |
| 2017/0048912 A1 | 2/2017 | Sharma et al. |
| 2017/0181156 A1 | 6/2017 | Nguyen |
| 2017/0295517 A1 | 10/2017 | Nguyen et al. |
| 2017/0318577 A1 | 11/2017 | Yang et al. |
| 2018/0035436 A1 | 2/2018 | Sharma et al. |
| 2018/0077587 A1 | 3/2018 | Al-Fanek et al. |
| 2018/0123920 A1 | 5/2018 | Dudda et al. |
| 2018/0167889 A1 | 6/2018 | Rajagopal et al. |
| 2018/0310207 A1 | 10/2018 | Dahod et al. |

FOREIGN PATENT DOCUMENTS

| | | |
|---|---|---|
| CN | 104137644 A | 11/2014 |
| EP | 1189388 A2 | 3/2002 |
| EP | 2200390 A2 | 6/2010 |
| EP | 2501141 A2 | 9/2012 |
| EP | 2523505 A1 | 11/2012 |
| EP | 2530988 A1 | 12/2012 |
| EP | 2747376 A1 | 6/2014 |
| EP | 2947903 A1 | 11/2015 |
| GB | 2525935 A | 11/2015 |
| JP | 2012523805 A | 10/2012 |
| JP | 2014-515584 A | 6/2014 |
| WO | WO-2010120828 A1 | 10/2010 |
| WO | WO-2011080714 A2 | 7/2011 |
| WO | WO-2012084636 A1 | 6/2012 |
| WO | WO-2012139016 A2 | 10/2012 |
| WO | WO-2012139664 A1 | 10/2012 |
| WO | 2012/163726 A1 | 12/2012 |
| WO | WO-2012177763 A2 | 12/2012 |
| WO | WO-2013029251 A1 | 3/2013 |
| WO | WO-2013038167 A2 | 3/2013 |
| WO | WO-2013116988 A1 | 8/2013 |
| WO | WO-2014127054 A1 | 8/2014 |
| WO | WO-2014130708 A1 | 8/2014 |
| WO | WO-2014130709 A1 | 8/2014 |
| WO | WO-2014130713 A1 | 8/2014 |
| WO | WO-2014160709 A2 | 10/2014 |
| WO | WO-2014160718 A1 | 10/2014 |
| WO | WO-2014160722 A1 | 10/2014 |
| WO | WO-2015167546 A1 | 11/2015 |
| WO | 2017/005854 A1 | 1/2017 |

OTHER PUBLICATIONS

Kuwano et al., Optical Access Technologies for Mobile Radio Access Network. IEICE Technical Report. Jan. 2013;112(401):121-5. [Japanese language document with English abstract].
Office Action for Japanese Application No. 2015-558115 dated Aug. 8, 2017.
Balakrishnan, et al., (1995); "Improving Reliable Transport and Handoff Performance in Cellular Wireless Networks", Wireless Networks, ACM, 1:469-481.
Border et al., (2001); "Performance Enhancing Proxies Intended to Mitigate Link-Related Degradations", Network Working Group Request for Comments: 3135; pp. 1-45.
CATT. L1 support for dual connectivity. 3GPP TSG RAN WG1 Meeting #74, Barcelona, Spain, Aug. 19-23, 2013.
Du, et al., (2009); "Downlink Scheduling for Multimedia Multicast/Broadcast over Mobile WiMAX: Connection-Oriented Multistate Adaptation", IEEE Wireless Communications, pp. 72-79.
International Search Report and Written Opinion for PCT/US2016/067271, dated Mar. 16, 2017.
International Search Report for PCT/US2014/016123, dated Jul. 22, 2014.
International Search Report for PCT/US2014/017456, dated Jul. 3, 2014.
International Search Report for PCT/US2014/017459, dated Jul. 3, 2014.
International Search Report for PCT/US2014/017464, dated Jun. 16, 2014.
International Search Report for PCT/US2014/031725, dated Oct. 7, 2014.
International Search Report for PCT/US2014/031744, dated Sep. 4, 2014.
International Search Report for PCT/US2014/031749, dated Aug. 5, 2014.

(56) References Cited

OTHER PUBLICATIONS

International Search Report for PCT/US2014/031753, dated Aug. 14, 2014.
Yoon, et al., (2012); "MuVi", Mobile Computing and Networking, ACM, pp. 209-220.
Huawei. Flow Control for Split Bearers. 3GPP TSG RAN WG3 Meeting #83bis. San Jose del Cabo, Mexico, Mar. 31-Apr. 4, 2014.
International Search Report and Written Opinion for PCT/US2017/026792, dated Jul. 17, 2017.
International Search Report with Written Opinion corresponding to International Patent Application No. PCT/US2016/017585, dated Dec. 20, 2016, 12 pages.

* cited by examiner

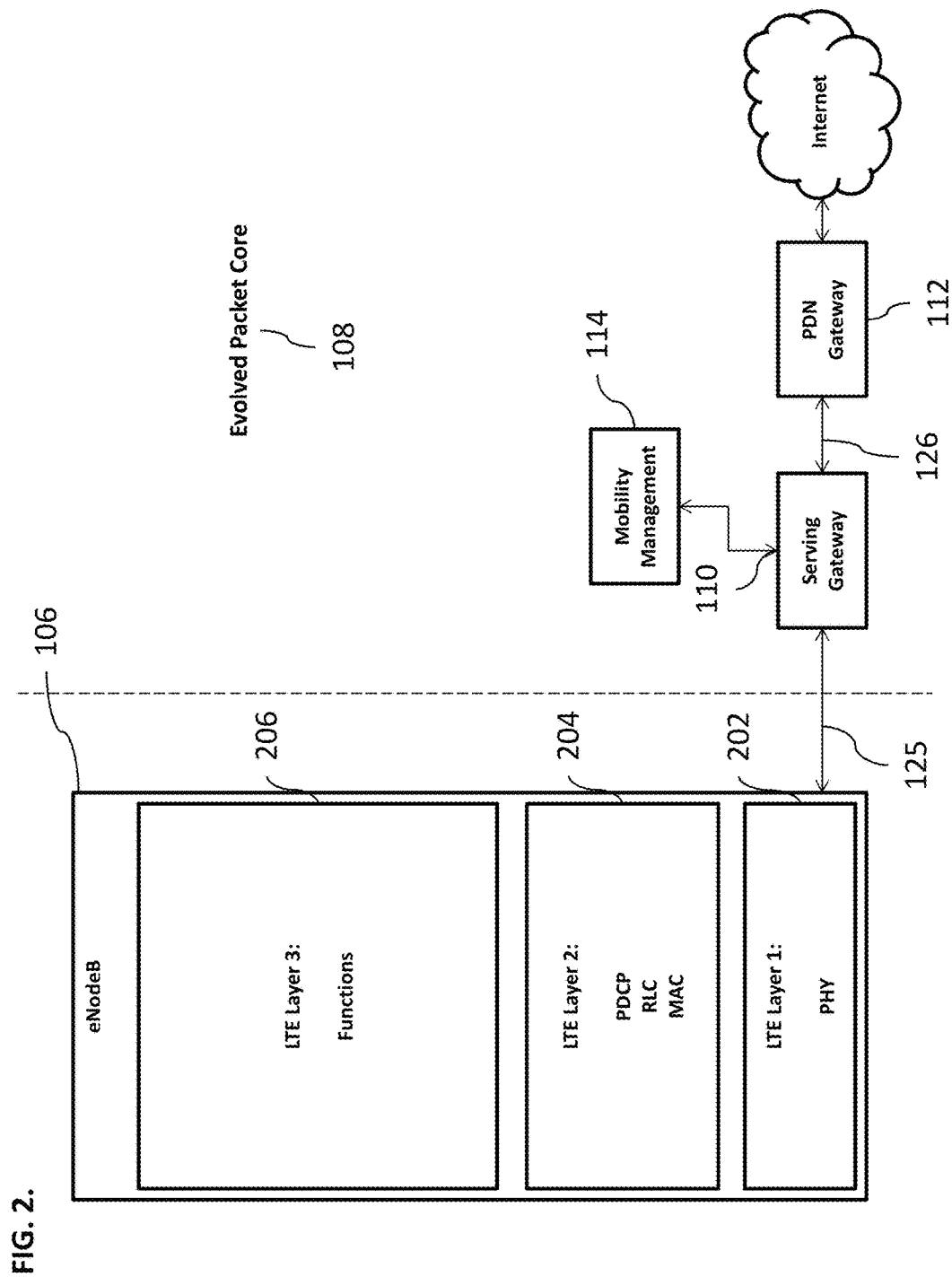

FIG. 4.

| RRC Connection Request Causes (36.331) |
|---|
| Emergency |
| High Priority Access |
| MT-Access |
| MO-Signaling |
| MO-Data |
| Delay Tolerance Access |
| MO-Voice Call |

402

Sample ARP Table

| ARP Priority | Pre-emption Capability | Pre-emption vulnerability | PF Scaling Factor (iPFu) | QCI Mapping | Min Bit Rate for NGBR (Mbps) |
|---|---|---|---|---|---|
| 1 | Yes | No | 2 | 70 | .50 |
| 2 | Yes | Yes | 1.75 | 6 | .40 |
| 3 | Yes | Yes | 1.5 | 7 | .30 |
| 4 | Yes | Yes | 1.25 | 8 | .20 |
| 5 | Yes | No | 1 | 1,5,65,69 | .10 |
| 6 | Yes | Yes | 1 | 2,3,4,66 | .10 |
| 7 | No | No | 1 | 66 | - |
| 8 | No | No | 1 | 9 | .10 |

| QCI | Resource Type | Priority Level | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video |
| 3 | GBR | 3 | 50 ms | $10^{-3}$ | Real Time Gaming |
| 4 | GBR | 5 | 300 ms | $10^{-6}$ | Non-Conversational Video |
| 65 | GBR | 0.7 | 75 ms | $10^{-2}$ | Mission Critical UP PTT Voice |
| 66 | GBR | 2 | 100 ms | $10^{-2}$ | Non-Mission-Critical UP PTT voice |
| 5 | NGBR | 1 | 100 ms | $10^{-6}$ | IMS Signaling |
| 6 | NGBR | 6 | 300 ms | $10^{-6}$ | ARP Priority 2 for HPA users |
| 7 | NGBR | 7 | 100 ms | $10^{-3}$ | ARP Priority 3 for HPA users |
| 8 | NGBR | 8 | 300 ms | $10^{-6}$ | ARP Priority 4 for HPA users |
| 9 | NGBR | 9 | 300 ms | $10^{-6}$ | Default Bearer for public users |
| 69 | NGBR | 0.5 | 60 ms | $10^{-6}$ | Mission Critical Delay Sensitive Signaling |
| 70 | NGBR | 5.5 | 200 ms | $10^{-6}$ | ARP Priority 1 for HPA users |

500

WIRELESS DATA PRIORITY SERVICES

CROSS-REFERENCE TO RELATED APPLICATIONS

The present application claims priority to U.S. Provisional Patent Appl. No. 62/320,161 to Nguyen et al., filed Apr. 8, 2016, and entitled "Wireless Data Priority Services", and incorporates its disclosure herein by reference in its entirety.

The present application relates to U.S. patent application Ser. No. 14/179,421, filed Feb. 12, 2014 to Dahod et al., and entitled "Long Term Evolution Radio Access Network," which claims priority to U.S. Provisional Patent Application No. 61/763,927, filed Feb. 12, 2013, and entitled "Long Term Evolution (LTE) Radio Access Network (RAN) Architecture," and incorporates their disclosures herein by reference in their entireties.

TECHNICAL FIELD

The subject matter described herein generally relates to data processing and in particular, to providing wireless data priority services in wireless communications system, such as a long term evolution network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

In some cases, various types of users of wireless communication systems can demand different types of access and/or priority of access. For example, emergency responders or other priority users (e.g., police, fire fighters, etc.) can require priority access to wireless communications networks for the purposes of communicating with different entities that may be involved in responding to a particular emergency situation (e.g., a man-made disaster, a hurricane, an earthquake, and/or any other natural disaster and/or emergency situation). Current systems that allow priority access are not capable of effectively and efficiently providing priority data services to such various users at a particular quality of service. Thus, there is a need for providing wireless data priority services for various types of users.

SUMMARY

In some implementations, the current subject matter relates to a computer implemented method for transmission of data packets using wireless data priority services in wireless communications system. The method can include determining a priority level for a user equipment, executing, based on the determined priority level for the user equipment, an admission control procedure to reserve transmission capacity for the user equipment, scheduling, based on the determined priority level for the user equipment and the reserved transmission capacity, at least one data packet for transmission to and/or from the user equipment, and transmitting, based on the scheduling, the at least one data packet.

In some implementations, the current subject matter can include one or more of the following optional features. At least one processor can be configured to perform at least one of the determining, the executing, the scheduling, and the transmitting, wherein a base station comprises the at least one processor and at least one memory. The base station can be an evolved node B node having a base band unit and a remote radio head. The base station can include at least one of the following: a macro base station, a micro base station, a femto base station, a pico base station, and any combination thereof.

In some implementations, the admission control procedure can be configured to reserve transmission capacity for at least one of the following: capacity available for non-guaranteed bit rate bearers, capacity available for public non-guaranteed bit rate bearers, capacity consumed by high priority access guaranteed bit rate bearers, capacity consumed by public guaranteed bit rate bearers, capacity reserved for high priority access, and capacity reserved for public use.

In some implementations, the admission control procedure can be performed based on at least one of the following: a requested bit rate for guaranteed bit rate bearers, minimum bit rate for non-guaranteed bit rate bearers, and minimum bit rate determined based on an allocation and priority information.

In some implementations, the scheduling can be performed based on an available transmission bandwidth, wherein the transmission bandwidth is determined based on at least one of the following: available bandwidth for public non-guaranteed bit rate bearers, available bandwidth for non-guaranteed bit rate bearers, consumed bandwidth by public guaranteed bit rate bearers, consumed bandwidth by high priority access guaranteed bit rate bearers, reserved bandwidth for high priority access bearers, and reserved bandwidth for public users.

In some implementations, the scheduling can also be performed based on at least one weighted proportionally fairness factor, the weighted proportionally fairness factor is determined based on at least one of the following: reserved bandwidth for high priority access bearers, available bandwidth for public non-guaranteed bit rate bearers, and available bandwidth for non-guaranteed bit rate bearers. The weighted proportionally fairness factor can be determined based on at least one of the following $$oPF_h = \text{Max}(X, A_h/(A_h+A_p))$$

$$oPF_p = \text{Max}(1-X, A_p/(A_h+A_p))$$

wherein $oPF_h$ is associated with a bandwidth for non-guaranteed bit rate bearers, and $oPF_p$ is associated with a bandwidth for public non-guaranteed bit rate bearers, X is the reserved bandwidth for high priority access bearers, $A_p$ is the available bandwidth for public non-guaranteed bit rate bearers, and $A_h$ is the available bandwidth for non-guaranteed bit rate bearers.

In some implementations, the method can also include determining, based on the determined priority of the user equipment, that the user equipment is a non-high priority access user equipment, transmitting, based on the determined priority of the user equipment, an overload signal from a first base station to a second base station, the non-high priority access user equipment is communicatively coupled with the first base station, and off-loading the non-high priority access user equipment from the first base station to the second base station.

In some implementations, the method can include barring the non-high priority access user equipment from communicating with the first base station based on an access class of the non-high priority access user equipment.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 2 illustrates further detail of an evolved Node B shown in FIGS. 1a-d;

FIG. 4 illustrates an exemplary user group identification and priority levels tables, according to some implementations of the current subject matter;

FIG. 5 illustrates an exemplary table containing QCI based priority levels, according to some implementations of the current subject matter;

DETAILED DESCRIPTION

To address the deficiencies of currently available solutions, one or more implementations of the current subject matter provide for transmission of data packets using wireless data priority services in a wireless communication system, such as a system that can be implemented in long-term evolution ("LTE") network having an intelligent capability. As stated above, some implementations of the current subject matter can be implemented in a long-term evolution communications system and/or any other type of communications systems. An exemplary long-term evolution communications system is described below.

I. Long Term Evolution Communications System

FIGS. 1a-c and 2 illustrate an exemplary conventional long-term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
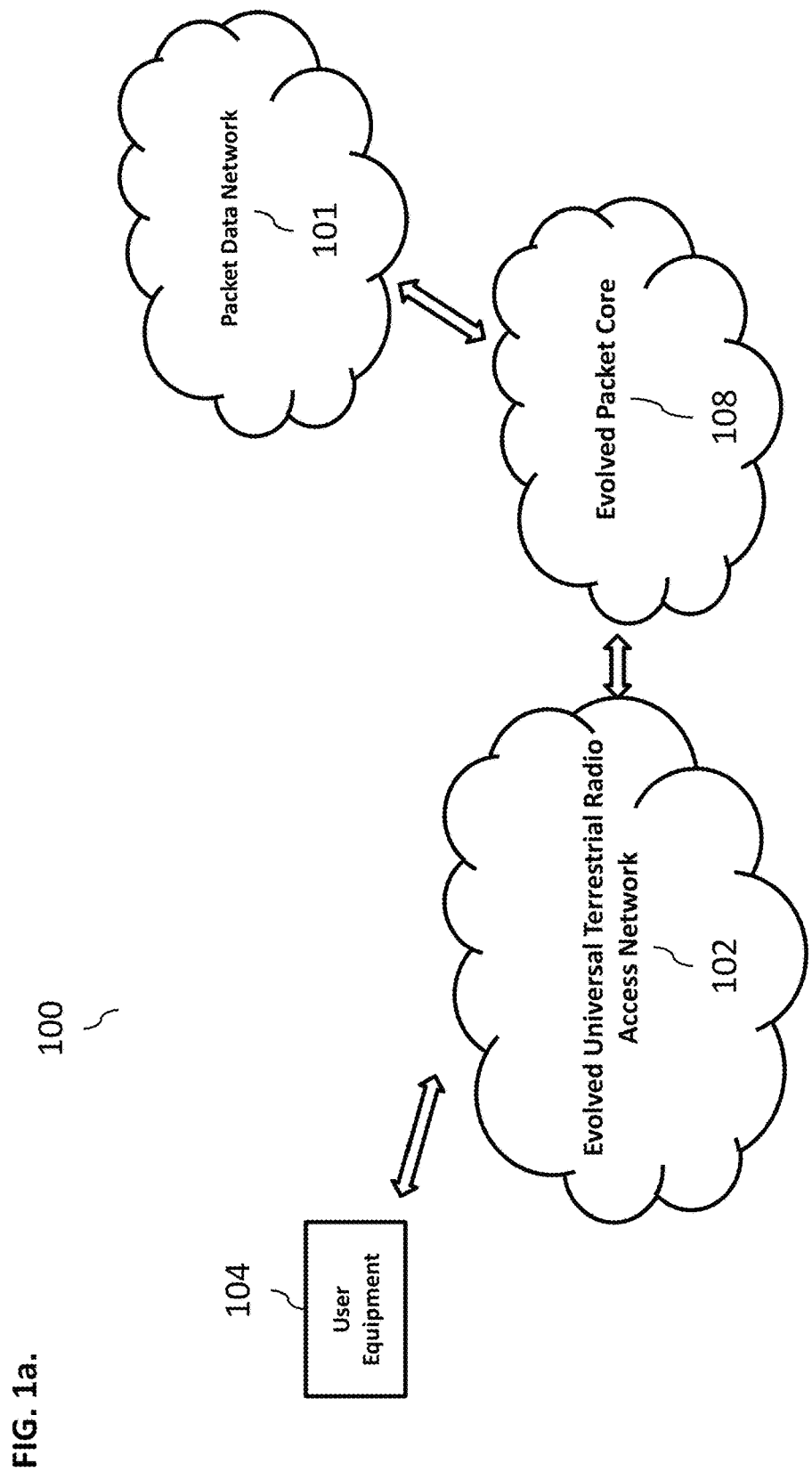
FIG. 1a illustrates an exemplary conventional long term evolution ("LTE") communications system.
Figure 1B:
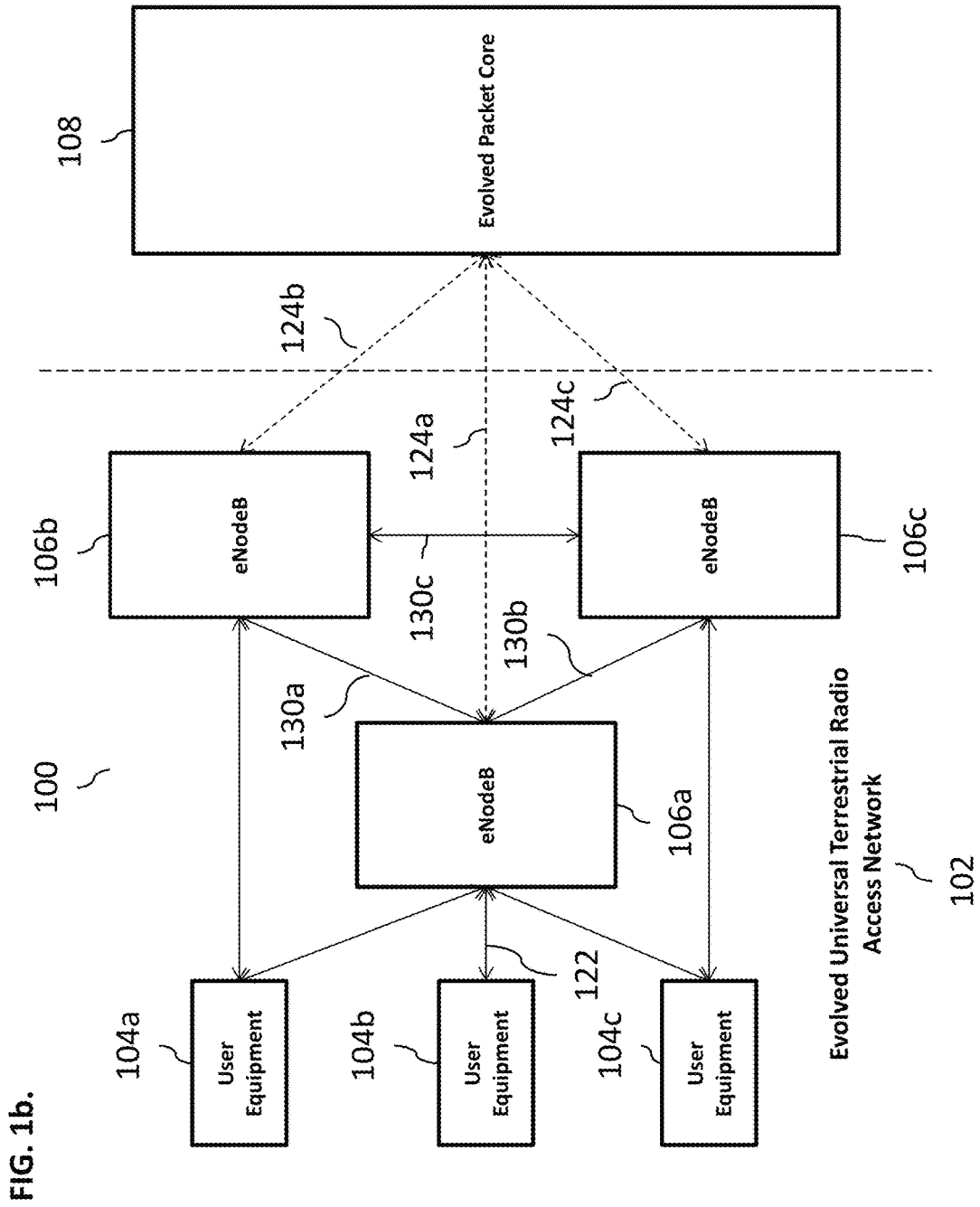

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
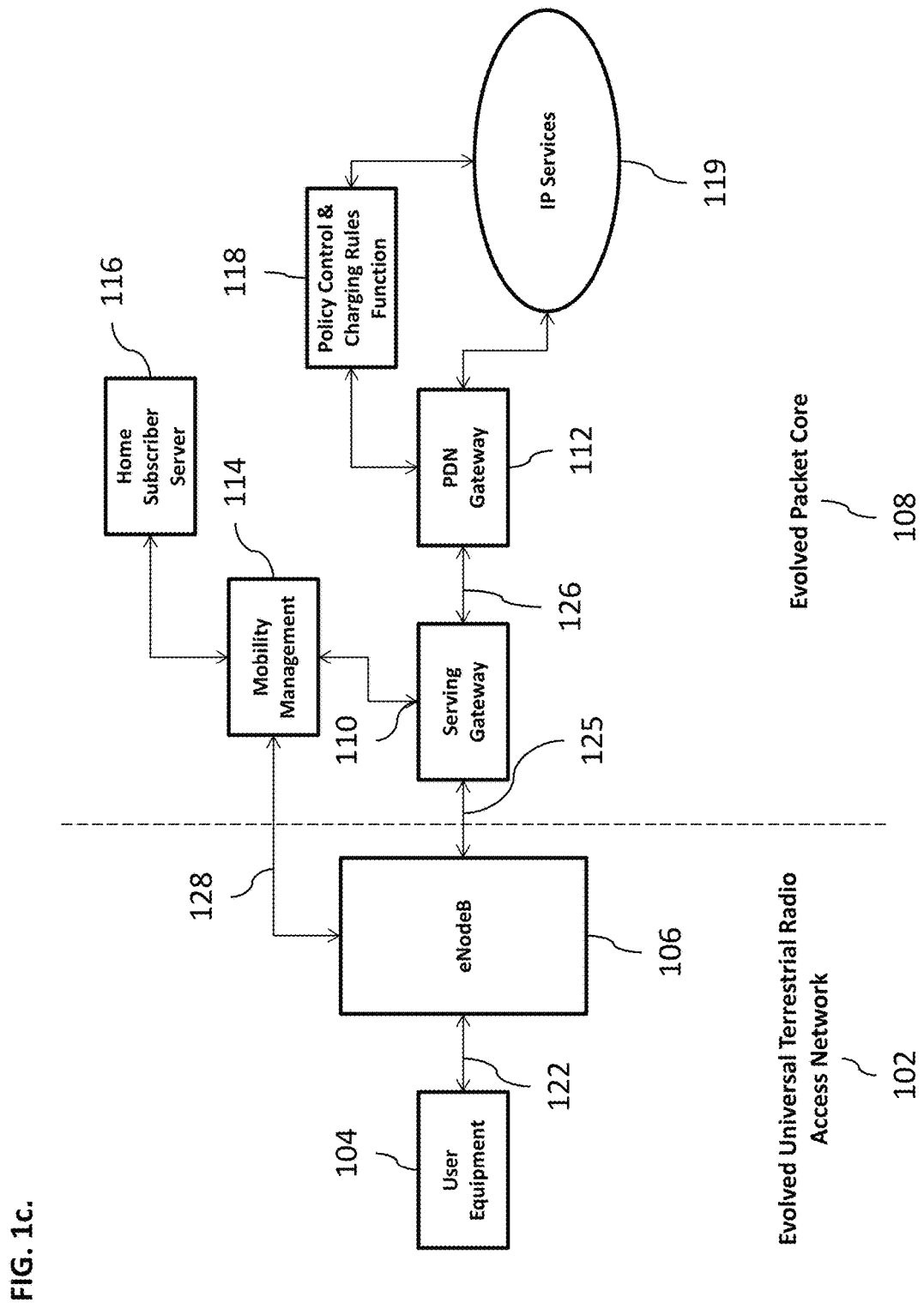

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MIME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
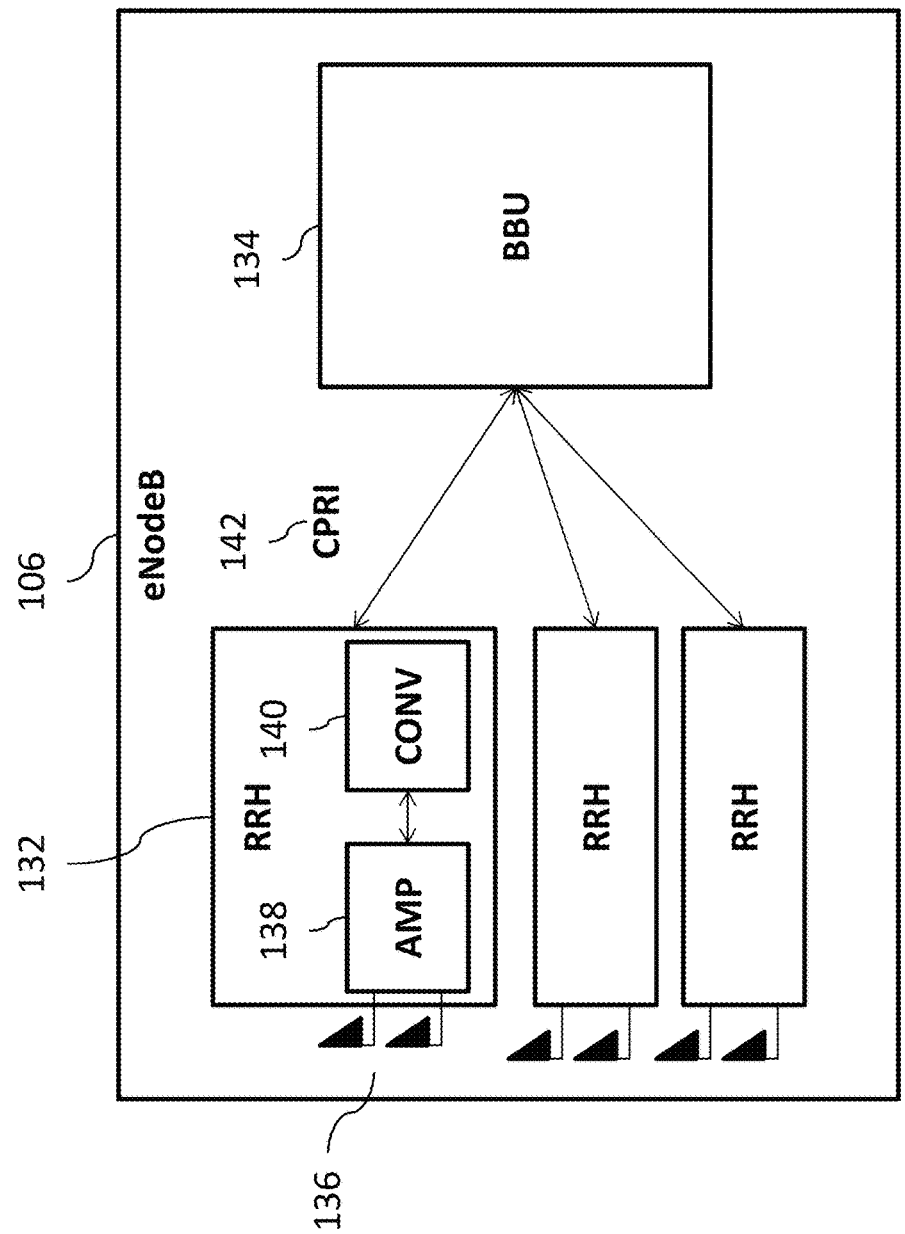

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

III. Intelligent LTE Radio Access Network

Figure 3:
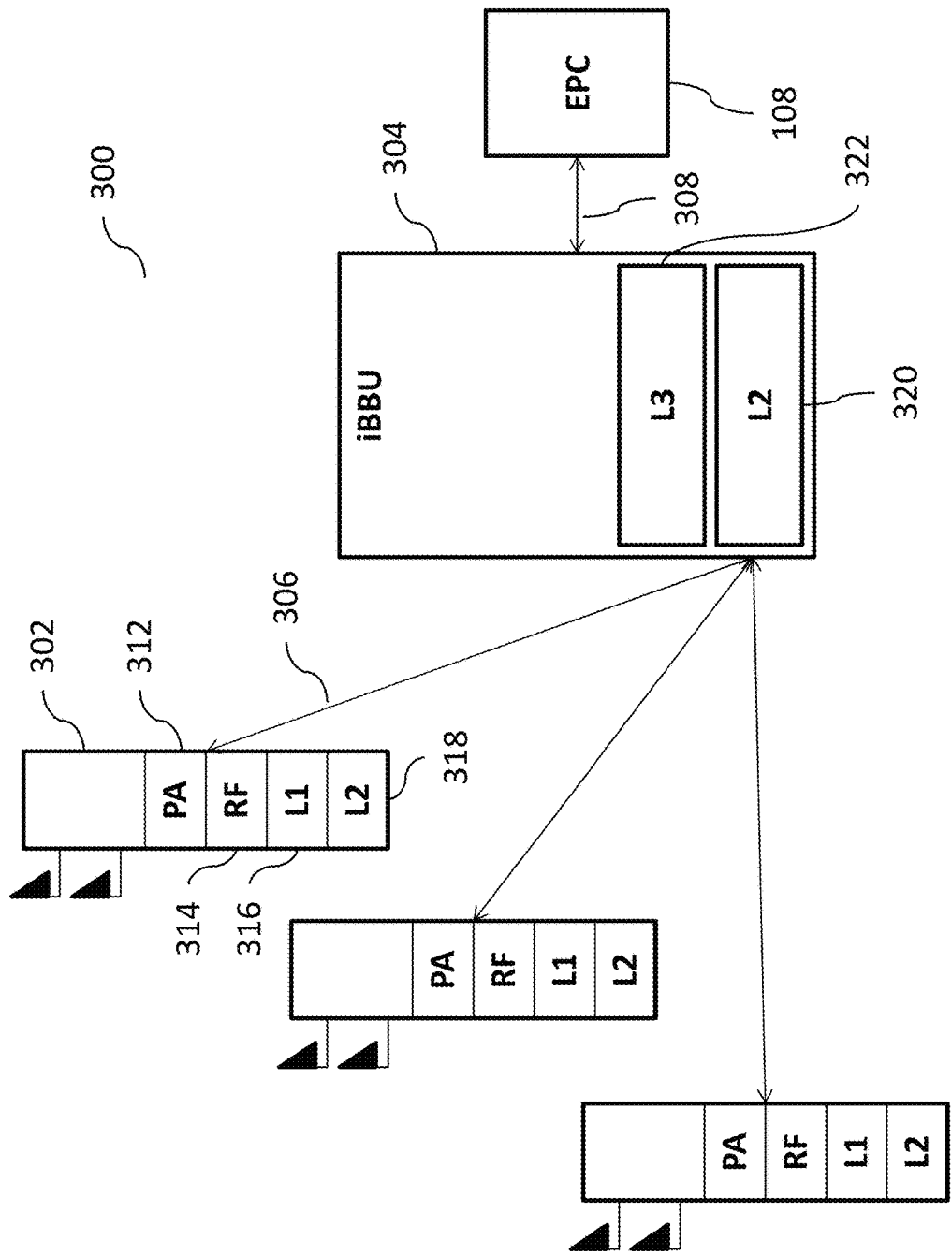
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

IV. Wireless Data Priority Services

In some implementations, the current subject matter can accommodate and/or allow access to users having various levels of priority. Calls of users having a specific level of priority ("priority users") can be prioritized over wireless networks. Priority users' user equipments can receive calling queue priority but might not preempt calls that may be in progress, and/or can provide priority status over cellular communications networks. Examples of priority users can include, but are not limited to, first responders, emergency management personnel, etc.

Figure 9:
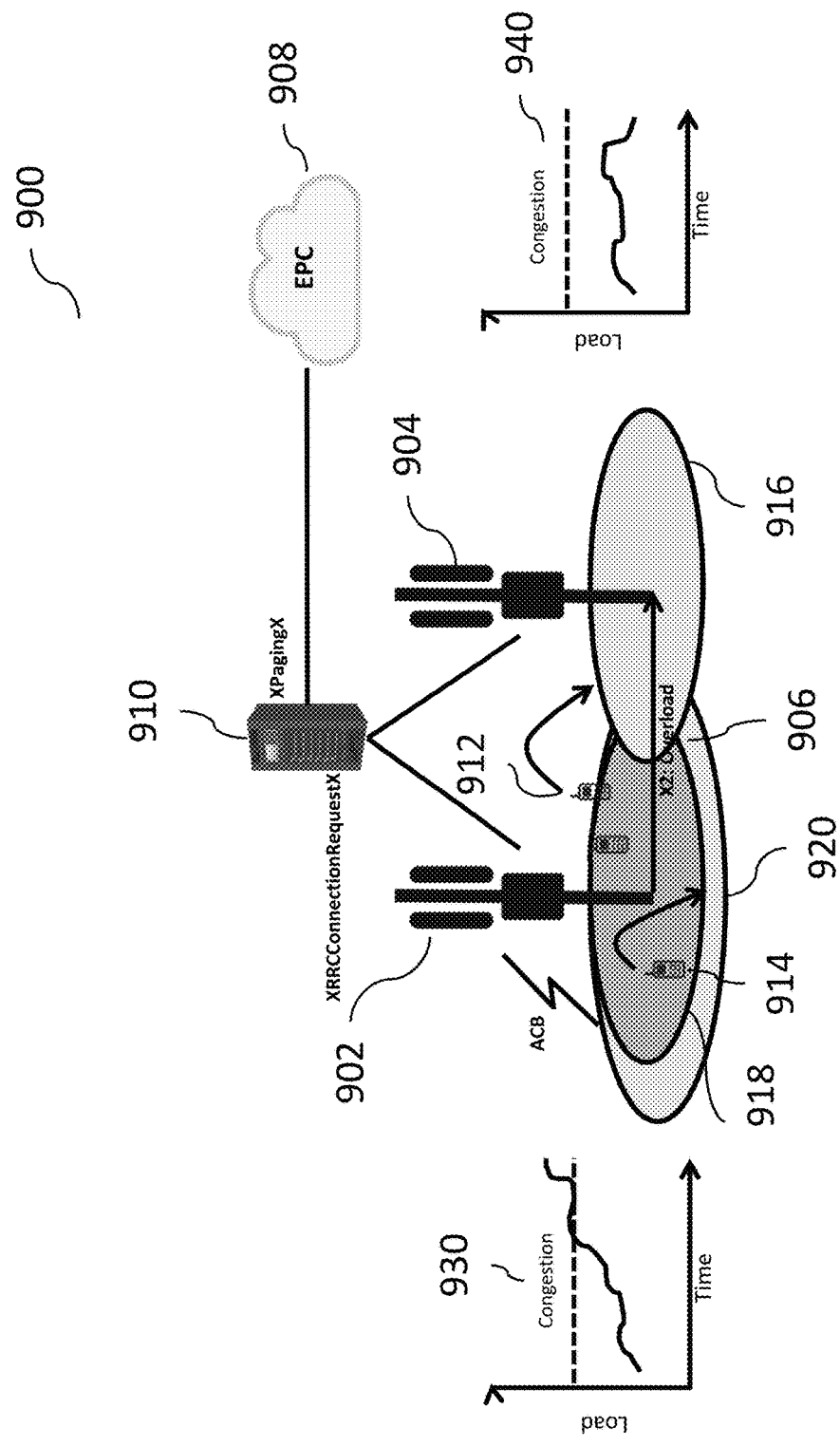
FIG. 9 illustrates an exemplary system for performing an overload control, according to some implementations of the current subject matter.

The prioritized access and/or use can be allowed for priority users and can be determined and/or granted using priority users' required quality of service ("QoS") as well as specific access times (e.g., during an emergency, etc.). The required quality of service and/or access times can be associated with a specific priority user at the time when the priority user is subscribed to the communications network (e.g., during activation). While priority users are granted priority access to the communications networks, other non-priority users and/or general subscribers that do not have priority status can access and/or utilize under-used and/or unreserved capacity of the communications networks. To allow priority access and/or use to priority users, the current subject matter can implement at least one of the following:

- user group identification and priority levels: classification of priority users and/or their priority levels (as shown and described in connection with FIGS. 4 and 5);
- admission control: ensuring that priority users gain access to the communications network while allowing for underused and/or unreserved capacity to be applied to non-priority users (as shown and described in connection with FIG. 6);
- scheduling and QoS: allocation of available resources to meet the QoS requirements of different priority user groups and/or their priority levels (as shown and described in connection with FIG. 7);
- overload control: management of existing connections and/or new connection requests to reduce overload conditions in the network (as shown and described in connection with FIG. 9).

FIG. 4 illustrates an exemplary user group identification and priority levels tables 402 and 404, according to some implementations of the current subject matter. The tables 402, 404 can be used to determine priority of user(s) and classify them into particular groups in accordance with their priority levels.

Table 402 can include RRC connection establishment causes, as described in the 3GPP TS 36.331 standard. These can include emergency (corresponds to NAS Procedure "MO-CS fallback Emergency call"), high priority access, MT-Access (corresponds to NAS procedures of "Service Request" (paging response for PS domain) or "Extended Service Request" (MT-CS fallback)), MO-Signaling (corresponds to NAS procedures of Attach, Detach, and TAU), MO-Data (corresponds to NAS Procedures of "Service Request" and "Extended Service Request"), delay tolerance access, and MO-Voice Call.

Table 404 can be an allocation and retention priority ("ARP") table, which can include at least one of the following columns: ARP priority, pre-emption capability, pre-emption vulnerability, proportional fairness ("PF") scaling factor ($iPF_u$) (i.e., factor relating to maintaining a balance between maximizing overall system throughput while providing all users with a minimum level of service), QCI mapping, and minimum bit rate for non-guaranteed bit rate ("NGBR") (in Mbps). As can be understood, table 404 is an exemplary table and is not limited to the one shown in FIG. 4. The ARP priorities 1-8 are typically defined by the local service provider and priorities 9-15 (not shown in FIG. 4) are typically defined by the network. Priority level "1" corresponds to highest priority, whereas priority level 14 corresponds to the lowest priority and priority level 15 corresponds to no priority.

Preemption capability column indicates that a particular user with a certain priority level can preempt other users (i.e., "Yes") when resources are limited. Preemption capability of "No" that a user cannot preempt other users when resources are limited.

Preemption vulnerability indicates that a particular user can be subject to being preempted by other users. Preemption vulnerability of "No" (e.g., ARP priority of 1, preemption capability of "Yes") indicates that this bearer cannot be preemptable by other bearers, whereas "Yes" (e.g., ARP priority of 2, preemption capability of "Yes") indicates that this bearer can be preemptable by other bearers.

The other columns are indicative of factors that can be used for the purposes of identifying and determining user priority levels as well as scheduling of a particular user. The user can indicate its priority upon transmission of a connection request.

In some implementations, users can be grouped based on RRC connection establishment cause, as shown in table 402, for high priority access ("HPA") at connection time and ARP priority and/or QCI mapped to an ARP priority at admission time. For example, ARP priority 1, 2, 3 and 4 can be HPA users. In some implementations, an emergency call can be configured as an HPA call and assigned a certain priority level. Priority levels of HPA users can be determined based on ARP priority and/or QCI of default bearer mapped to an ARP priority. In some implementations, the current subject matter can support further priority levels (e.g., such as those identified in LTE-A release 12 (e.g., QCI 70) for additional priority levels).

FIG. 5 illustrates an exemplary table 500 containing QCI based priority levels, according to some implementations of the current subject matter. Table 500 can be divided between guaranteed-bit rate ("GBR") QCI levels and non-guaranteed bit rate ("NGBR") QCI levels, each of which can correspond to various services. A guaranteed bit rate is a minimum guaranteed bit rate per evolved packet system ("EPS") bearer (e.g., required for voice over Internet protocol ("VoIP"), conversational video, real time gaming, etc.). QCI levels 1, 2, 3, 4, 65, 66 are associated with GBR. For example, QCI 1 can correspond to conversational voice service and can have a priority level 2, packet delay budget ("PDB") of 100 ms, and a packet error loss rate ("PELR") of $10^{-2}$. Non-guaranteed bit rate corresponds to a situation when bearer does not provide a guaranteed bit rate and is typically used for services which do not require a minimum guaranteed bit rate (e.g., voice/video streaming, email, chat, etc.). QCI levels 5, 6, 7, 8, 9, 69, 70 are associated with NGBR.

In some exemplary implementations, a delay of 20 ms for the delay between a policy and charging enforcement function ("PCEF") and a radio base station can be subtracted from a specific PDB to derive the packet delay budget that can apply to the radio interface. This delay can represent an average between the scenario where the PCEF is located "close" to the radio base station (e.g., roughly 10 ms) and the scenario where the PCEF is located "far" (e.g., at an edge) from the radio base station. For example, in case of roaming with home routed traffic (e.g., one-way packet delay between Europe and the US west coast is approximately 50 ms). The average takes into account that roaming is a less typical scenario. It is expected that subtracting this average delay of 20 ms from a given PDB can lead to desired end-to-end performance in most typical cases. Also, the PDB can define an upper bound. Actual packet delays, in particular for GBR traffic, can typically be lower than the PDB specified for a QCI as long as the UE has sufficient radio channel quality.

In some cases, a rate of non-congestion related packet losses that may occur between a radio base station and a PCEF can be regarded as negligible. A PELR value specified for a standardized QCI can be applicable to the radio interface between a user equipment and radio base station.

QCI can be typically associated with an operator-controlled service, i.e., a service where the service data flow ("SDF") aggregate's uplink/downlink packet filters can be known at the point in time when the SDF aggregate is authorized. In case of E-UTRAN, this is the point in time when a corresponding dedicated evolved packet system ("EPS") bearer is established/modified. If the network supports multimedia priority services ("MPS"), then QCI can be used for the prioritization of non-real-time data (i.e., most typically TCP-based services/applications) of MPS subscribers. Further, QCI can be used for a dedicated "premium bearer" (e.g., associated with premium content) for any subscriber/subscriber group. Also, in this case, the SDF aggregate's uplink/downlink packet filters can be known at the point in time when the SDF aggregate is authorized. Alternatively, QCI can be used for the default bearer of a UE/PDN for "premium subscribers". Further, QCI can be used for the default bearer of a UE/PDN for non-privileged subscribers. Aggregate maximum bit rate ("AMBR") can be used as a "tool" to provide subscriber differentiation between subscriber groups connected to the same PDN with the same QCI on the default bearer. QCI value can be assigned upon request from the network side. The UE and any applications running on the UE are not allowed to request this QCI value.

In some implementations, for various critical services, it may be assumed that the PCEF is located "close" to the radio base station (roughly 10 ms) and is not normally used in a long distance, home routed roaming situation. Hence, delay of 10 ms for the delay between a PCEF and a radio base station is subtracted from this PDB to derive the packet delay budget that applies to the radio interface.

In some implementations, in both RRC idle and RRC connected mode, the PDB requirement for these QCIs can be relaxed for the first packet(s) in a downlink data or signalling burst in order to permit reasonable battery saving techniques (e.g., during discontinuous reception ("DRX")).

Figure 6:
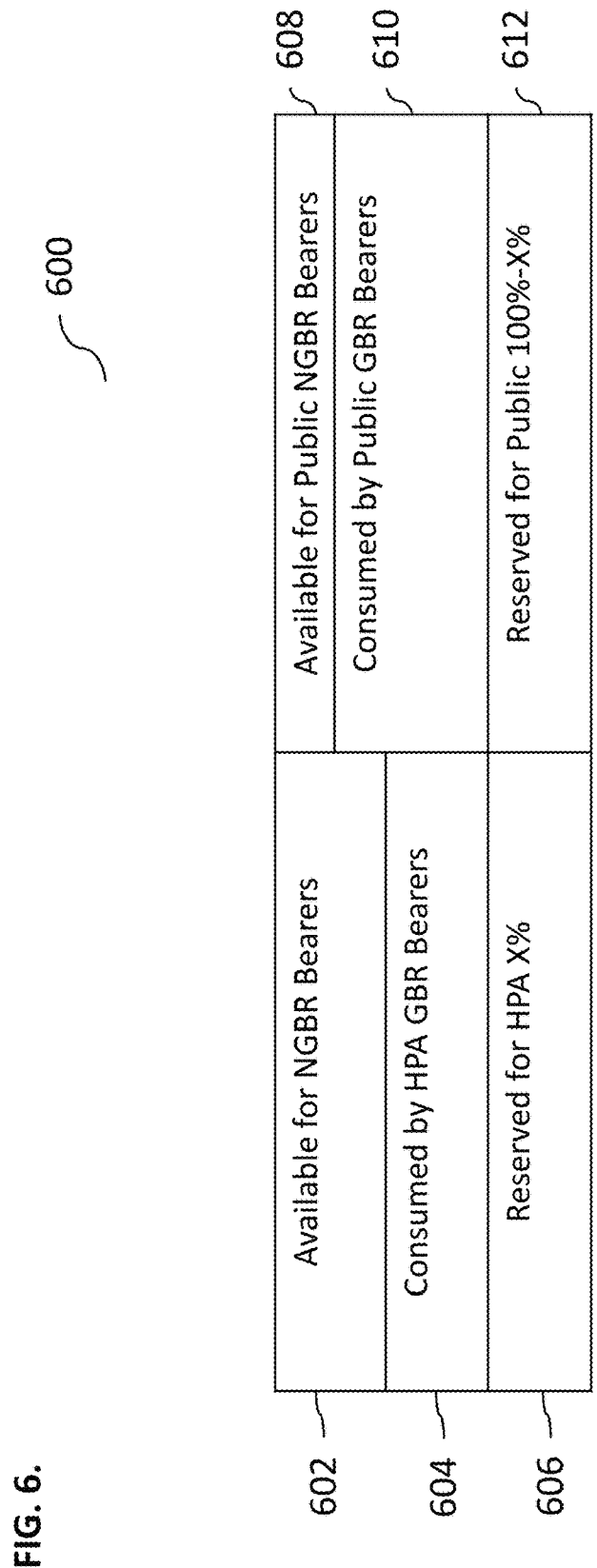
FIG. 6 illustrates an exemplary admission control table, according to some implementations of the current subject matter.

FIG. 6 illustrates an exemplary admission control table 600, according to some implementations of the current subject matter. Using the admission control table 600, capacity can be reserved for high priority and other (e.g., public) users. As shown in table 600, capacity can be split as follows: available for NGBR bearers capacity 602, available for public NGBR bearers capacity 608, consumed by HPA GBR bearers capacity 604, consumed by public GBR bearers capacity 610, a percentage of X % reserved for HPA capacity 606, and the remaining percentage (100%–X %) reserved for public use capacity 612.

This split can allow resource reservation for HPA users and various other users, e.g., commercial users. Admission criteria can be based on system ability to meet the requested bit rate for GBR users and minimum bit rate for NGBR users. Minimum bit rate can be configured based on an ARP priority. Public users can consume HPA reserved resources if all HPA NGBR users can be served with required minimum bit rate multiplied by X, where X is a configurable integer multiplier. In some implementations, the value X can be determined based on various factors, conditions, etc. relating to the wireless communications systems, including, but not limited to, being statically and/or dynamically and/or both determined for particular components and/or overall system. HPA users can start to consume public resources as a public user status if reserved HPA resources run out. The ARP priority level for such users can be temporarily assigned a public user priority level. Load balancing of users and pre-emption of commercial users and lower priority HPA users based on ARP and/or QCI can be used to admit higher priority HPA users. Further, periodic re-admission procedures can be used to prevent overloading of cells. Users can go through re-admission process based on their original ARP priority level, which can determine their user grouping, e.g., HPA or public. The re-admission can occur on periodic basis (e.g., every minute, every second, etc. and/or at any other time period), automatically, and/or manually and/or using any combination thereof.

In some implementations, one or more portions or all of the information contained in table 600 can be stored and/or by one or more processors and/or memory associated with one or more communication components of a wireless communication network (e.g., as shown in FIGS. 1a-3). For example, the information in table 600 can be stored and/or used by a base station, e.g., an eNodeB, and/or any of its components. Alternatively, the information contained in the table 600 can be stored and/or used by any other components in the communications network.

Figure 7:
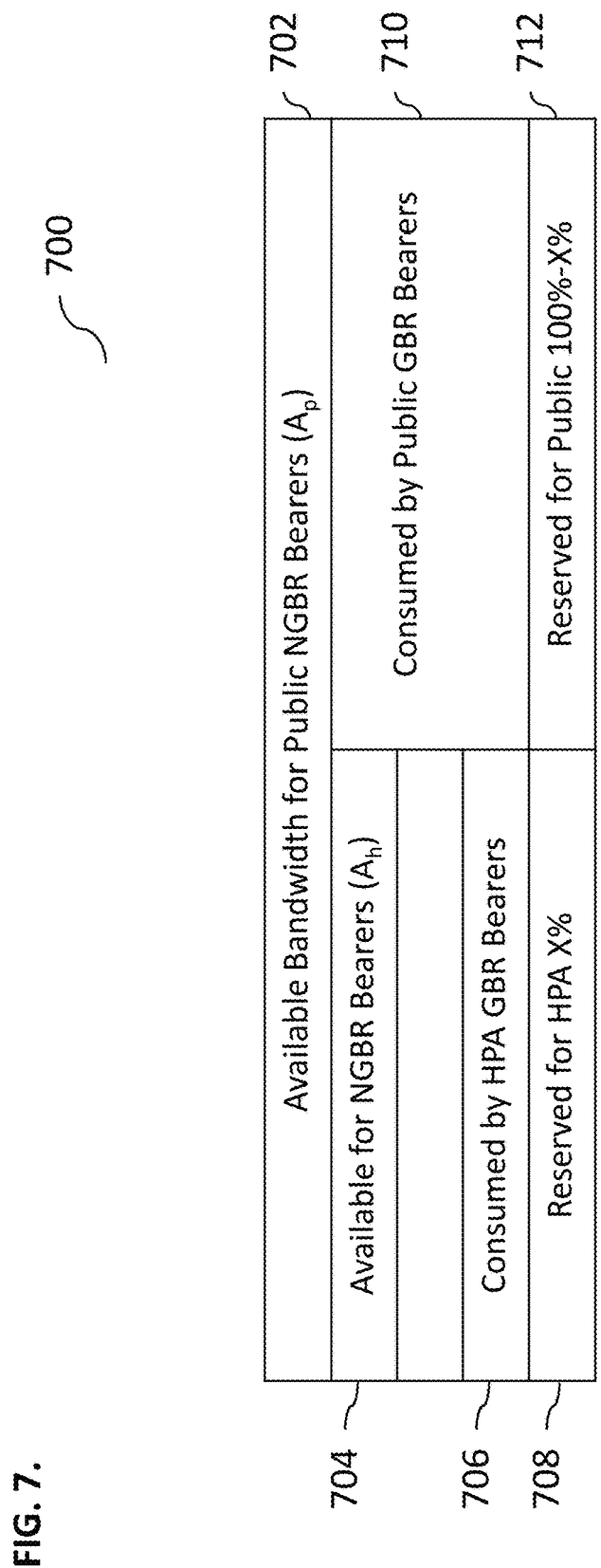
FIG. 7 illustrates an exemplary scheduling and QoS table, according to some implementations of the current subject matter.

FIG. 7 illustrates an exemplary scheduling and QoS table 700, according to some implementations of the current subject matter. Scheduling and QoS for users can depend on a variety of factors, including availability of bandwidth, QoS requirements (e.g., latency and jitter), minimum bit rates (for GBR and NGBR users), etc. The bandwidth can be split between available bandwidth for public NGBR bearers ($A_p$) 702, available bandwidth for NGBR bearers ($A_h$) 704, consumed bandwidth by public GBR bearers 710, consumed bandwidth by HPA GBR bearers 706, reserved bandwidth for HPA (at X %) 708 and reserved bandwidth for public users (at 100%–X %) 712. The scheduling can be performed using a scheduling processor. The scheduling processor can be implemented in a base station (e.g., an eNodeB) and/or anywhere else in the wireless communications system.

Figure 8:
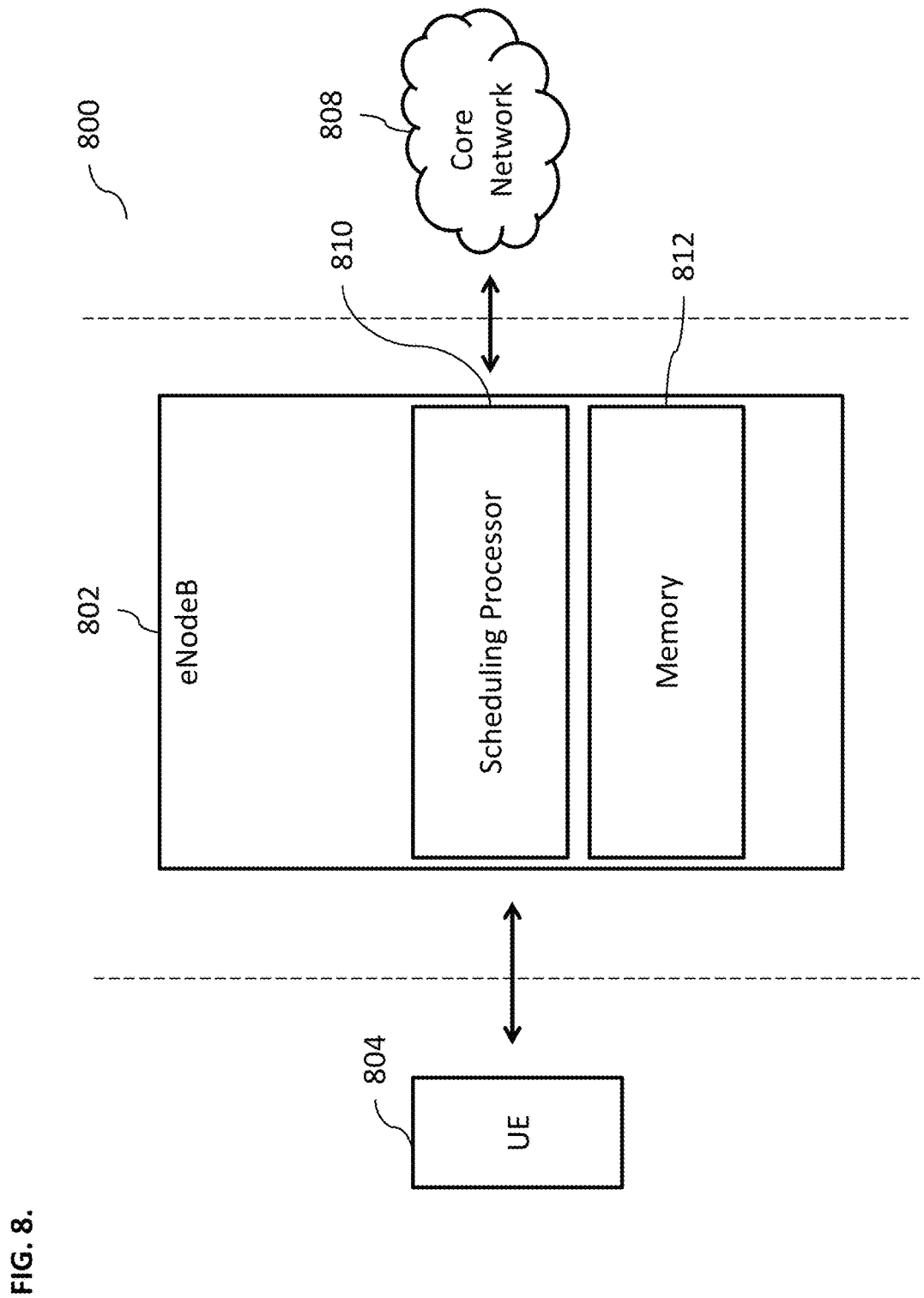
FIG. 8 illustrates an exemplary wireless communications system having a scheduling processor implemented in the base station, according to some implementations of the current subject matter.

FIG. 8 illustrates an exemplary wireless communications system 800 having a scheduling processor implemented in the base station, according to some implementations of the current subject matter. The system 800 can include a user equipment 804, a base station (e.g., an eNodeB) 806, and a core network 808. The eNodeB 806 can correspond to an eNodeB shown and described above with reference to FIG. 3. In the case of a RAN architecture, e.g., such as the one shown in FIG. 3, the eNodeB 806 can correspond to the intelligent baseband unit 304. The eNodeB 806 can include, among other components, a scheduling processor 810 and a memory 812. While shown as separate components in FIG.

8, the scheduling processor 810 and the memory 812 (as well as any other components) can be integrated in one or more processing components. In some implementations, the packet scheduling processor 810 can be provided as a software module in a processor that is specifically programmed to implement the functions described herein with reference to this processor.

The scheduling processor 810 can assign and/or allocate resource blocks for a particular communication link. Assignment/allocation of resource blocks can be based on the bearer allocation table shown in FIG. 7 and/or any other predefined settings stored in memory 812. The resource blocks can be also assigned/allocated based on any other information, which can include information detected through inspection of the data packets, user equipment identification information, channel conditions of the communication link with the user equipment and/or the core network, and/or any other factors.

For example, the scheduling processor 810 can also take into account the application type (e.g., voice, text, etc.), time of transmission/receipt of data packet, the size of the file associated with the data packet, the provider of the content, the user device type or profile information associated with the user/user equipment, QoS requirements for the data packet and/or user equipment, a channel quality indication ("CQI") determined by the eNodeB 806, a buffer status report ("BSR") of the eNodeB buffer, a power headroom report ("PHR"), and/or a predefined priority for the content corresponding to the data packet content, and/or any combination thereof.

In some implementations, the scheduling processor 810 can be provided on in layer 2 of the base station as shown in FIGS. 2 and 3. In those implementations in which functions of layer 2 are subdivided between the iBBU 306 and iRRHs 302, the scheduling processor 810 can be implemented as part of the layer 2 functions that remain with the iBBU 306. The scheduling processor 810 can also be provided on a separate functional layer from the functional layers described with reference to FIGS. 2 and 3. The scheduling processor 810 can be configured to communicate and coordinate with other functions performed by the base station 806. In some implementations, the packet scheduling processor 810 can coordinate with the MAC layer, and in particular, a hybrid automatic repeat request ("HARQ") manager of the MAC layer, as well as, with a physical layer of the base station.

In some implementations, the scheduling processor can implement a modified proportionally fairness scheduling approach. As stated above, proportional fair is a scheduling approach that attempts to find a balance between maximizing overall system throughput and provide all users with a minimum level of service. Each data flow can be assigned a data rate or a scheduling priority that can be inversely proportional to its anticipated resource consumption. A proportionally fair metric can be determined for all active users in a particular scheduling interval. The user having the highest metric can be allocated the resource available in that interval and the metrics for all users can be updated before the next scheduling interval. This process can be repeated many times. In OFDMA systems, the scheduling interval can be a radio frame and multiple users can be allocated in the same radio frame. The proportionally fair scheduling algorithm can equally partitioned the frames into regular, fixed scheduling resources that are scheduled sequentially until all available resources are assigned and/or the determined metric can be updated after scheduling each partition. In some cases, a single user can obtain multiple and/or all resources in the frame.

The scheduling processor 810 can store proportionally fairness ("PF") weight factors. The weight factors can correspond to weights that are determined based on the cost per data bit of data flow. For example in CDMA spread spectrum cellular networks, the cost can correspond to energy (e.g., interference level) that may be required. In dynamic channel allocation systems, the cost can correspond to number of base stations (e.g., eNodeBs) that cannot use the same frequency channel (e.g., to avoid co-channel interference). The scheduling processor can store inner weight factors and outer weight factors. The factors can be used to determine bandwidth allocation on per user equipment for the NGBR bearers.

In some implementations, one of the outer weight factors (i.e., $oPF_h$) can be associated with the NGBR bearers (i.e., those in the category 704 as shown in table 700 in FIG. 7). The other outer weight factor (i.e., $oPF_p$) can be associated with the bandwidth for public NGBR bearers (i.e., those in the category 702 as shown in table 700 in FIG. 7). These factors can be proportional to the available bandwidth for NGBR in two resource pools (i.e., 702 and 704, as shown in FIG. 7). The factors can be represented as a maximum function of the X value (as described above and shown in FIG. 7). The factors can be determined using the following equations:

$$oPF_h = \text{Max}(X, A_h/(A_h+A_p)) \quad (1)$$

$$oPF_p = \text{Max}(1-X, A_p/(A_h+A_p)) \quad (2)$$

Based on the above formulas, the $oPF_h$ factor can be greater than or equal to X value. The scheduling processor 810 can use the above outer weight factors to generate a ranking of NGBR bearers so that appropriate bit rates can be assigned to each bearer in accordance with its requirements and/or other characteristics (e.g., channel conditions, minimum rate requirements, etc.). In some implementations, the determined available bandwidth for public NGBR users can be greater than and/or equal to the minimum required NGBR bandwidth for all admitted public users. In some implementations, the current subject matter can implement user differentiation based on a PF inner weight factor ($iPF_u$) per logical bearer based on ARP priority in the PF scheduler for NGBR user.

FIG. 9 illustrates an exemplary system 900 for performing an overload control, according to some implementations of the current subject matter. The system 900 can include a processor 910 (which can be incorporated in an eNodeB and/or anywhere else in a system 900). The system 900 can include one or more cell sites 902, 904 (e.g., eNodeBs), which can be communicatively coupled to an evolved packet core ("EPC"). One or more processor 910 can be incorporated into the cell sites 902, 904. The cell sites 902, 904 can be communicatively coupled using an X2 interface 906, which can be used to provide an overload control between the cell sites 902, 904. The cell site 902 can provide wireless communication service(s) to an (e.g., geographic) area 920 and the cell site 904 can provide wireless communication service(s) to an area 916. As shown in FIG. 9, the cell site 902 can include an area 918 outside of which an access class barring ("ACB") procedure can be performed (e.g., during RRC connection setup procedure, user equipment can review the cell-broadcasted access class barring information and determine whether connection procedure should continue (e.g., users in access classes 11-15 can be barred)).

The system 900 can handle various overload conditions, including multi-level overload conditions that can be based on configurable thresholds for CPU occupancy, memory utilization, transport resource utilization, etc. Upon detection of an overload condition (shown by the plot 930 in FIG. 9) in cell site 902, the cell site 902 can transmit an "X2: overload" signal via the X2 interface 906 to its neighbor cell site 904. This signal can provide a notice to the cell site 904 that the cell site 902 will be off-loading one of its user equipments to the cell site 904. The cell site 902 can then offload user equipments located within its area 920 to other frequencies and/or to the neighbor cell site 904 (or other cell sites). For example, as a result of an overload condition at cell site 902, as shown by a congestion plot 930, a user equipment 914 located within area 918 can be off-loaded to another frequency (or, alternatively, barred) in the area 920. User equipment 912 located within the area 920 can be off-loaded to another cell site (e.g., site 904).

The RRC connection requests of non-HPA users and low priority paging ("XPagingX" as coming from the EPC 908) can be paced. The EPC 908 can provide an indication of low priority, thereby triggering the pacing procedure. Pacing can be used to reduce traffic over the wireless communication system. It can perform rate limiting, where traffic delivery to a device can be slowed down to a point in time when delivery occurs. This can be used to avoid traffic bursts and allow for even data flow.

In some implementations, in order to deal with the overload conditions, the current subject matter can implement an adaptive access class barring for some users, e.g., non-HPA users (e.g., user equipment 914, which can be a non-HPA user, can be subject to the access class control procedure). Once the congestion is reduced (e.g., as shown by plot 940 in FIG. 9), some of the users can be returned to their previous frequencies. This can allow for cycling of users through access classes. Further, the current subject matter can also increase a number of access classes to simultaneously bar based on severity of the overloading/congestion.

Figure 10:
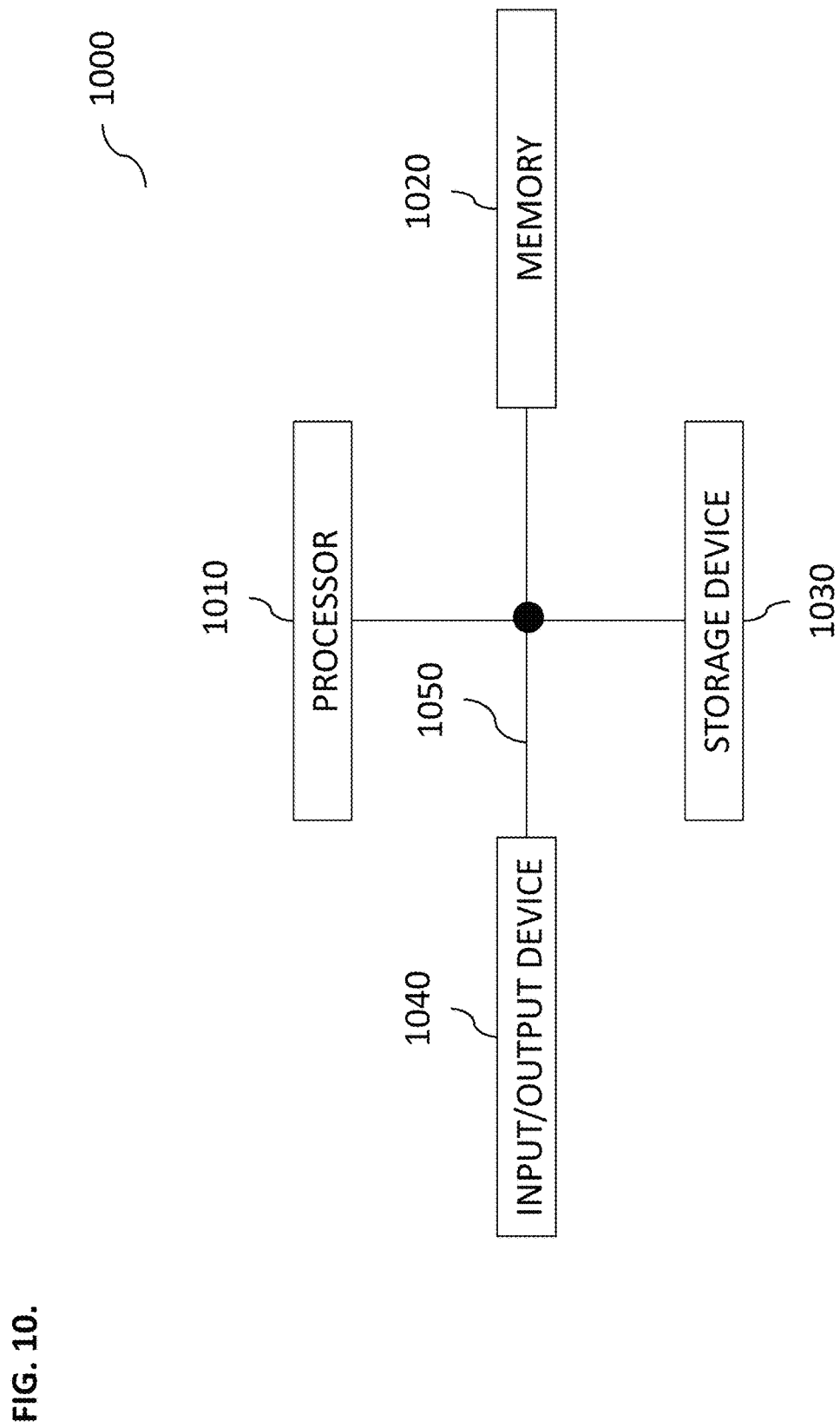
FIG. 10 illustrates an exemplary system, according to some implementations of the current subject matter.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
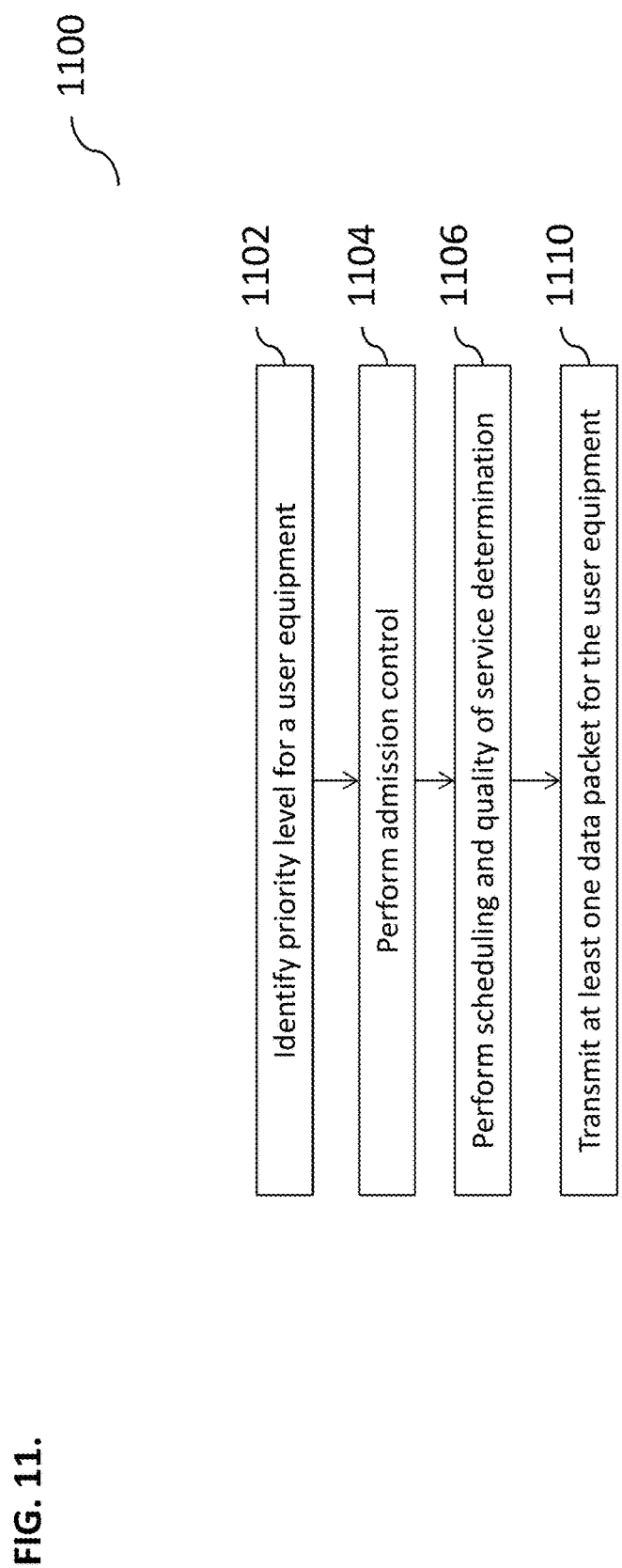
FIG. 11 illustrates an exemplary method, according to some implementations of the current subject matter.

FIG. 11 illustrates an exemplary method 1100 for providing wireless data priority services, according to some implementations, of the current subject matter. At 1102, a priority level can be identified for a user equipment. At 1104, an admission control can be executed based on the determined priority level for the user equipment. This procedure can be used to reserve transmission capacity for the user equipment. At 1106, based on the determined priority level for the user equipment and the reserved transmission capacity, at least one data packet can be scheduled for transmission to and/or from the user equipment. At 1108, transmission of at least one data packet can be performed for the user equipment.

In some implementations, the current subject matter can include one or more of the following optional features. At least one processor can be configured to perform at least one of the determining, the executing, the scheduling, and the transmitting (i.e., operations 1102-1108), wherein a base station comprises the at least one processor and at least one memory. The base station can be an evolved node B node having a base band unit and a remote radio head. The base station can include at least one of the following: a macro base station, a micro base station, a femto base station, a pico base station, and any combination thereof.

In some implementations, the admission control procedure can be configured to reserve transmission capacity for at least one of the following: capacity available for non-guaranteed bit rate bearers, capacity available for public non-guaranteed bit rate bearers, capacity consumed by high priority access guaranteed bit rate bearers, capacity consumed by public guaranteed bit rate bearers, capacity reserved for high priority access, and capacity reserved for public use.

In some implementations, the admission control procedure can be performed based on at least one of the following: a requested bit rate for guaranteed bit rate bearers, minimum bit rate for non-guaranteed bit rate bearers, and minimum bit rate determined based on an allocation and priority information.

In some implementations, the scheduling can be performed based on an available transmission bandwidth, wherein the transmission bandwidth is determined based on at least one of the following: available bandwidth for public non-guaranteed bit rate bearers, available bandwidth for non-guaranteed bit rate bearers, consumed bandwidth by public guaranteed bit rate bearers, consumed bandwidth by high priority access guaranteed bit rate bearers, reserved bandwidth for high priority access bearers, and reserved bandwidth for public users.

In some implementations, the scheduling can also be performed based on at least one weighted proportionally fairness factor, the weighted proportionally fairness factor is determined based on at least one of the following: reserved bandwidth for high priority access bearers, available bandwidth for public non-guaranteed bit rate bearers, and available bandwidth for non-guaranteed bit rate bearers. The weighted proportionally fairness factor can be determined based on at least one of the following $$oPF_h = \text{Max}(X, A_h/(A_h+A_p))$$

$$oPF_p = \text{Max}(1-X, A_p/(A_h+A_p))$$

wherein $oPF_h$ is associated with a bandwidth for non-guaranteed bit rate bearers, and $oPF_p$ is associated with a bandwidth for public non-guaranteed bit rate bearers, X is the reserved bandwidth for high priority access bearers, $A_p$ is the available bandwidth for public non-guaranteed bit rate bearers, and $A_h$ is the available bandwidth for non-guaranteed bit rate bearers.

In some implementations, the method can also include determining, based on the determined priority of the user equipment, that the user equipment is a non-high priority access user equipment, transmitting, based on the determined priority of the user equipment, an overload signal from a first base station to a second base station, the non-high priority access user equipment is communicatively coupled with the first base station, and off-loading the non-high priority access user equipment from the first base station to the second base station.

In some implementations, the method can include barring the non-high priority access user equipment from communicating with the first base station based on an access class of the non-high priority access user equipment.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising
determining a priority level for a user equipment;
executing, based on the determined priority level for the user equipment, an admission control procedure to reserve transmission capacity for the user equipment;
scheduling, based on the determined priority level for the user equipment and the reserved transmission capacity, at least one data packet for transmission to or from the user equipment, the scheduling including
determining at least one weighted proportionally fairness factor using a first factor associated with a bandwidth for non-guaranteed bit rate bearers, and a second factor associated with a bandwidth for public non-guaranteed bit rate bearers, the first and second factors being determined based on at least one of the following: a reserved bandwidth for high priority access bearers, an available bandwidth for public non-guaranteed bit rate bearers, and an available bandwidth for non-guaranteed bit rate bearers;
ranking, using the at least one weighted proportionally fairness factor, non-guaranteed bit rate bearers and assigning bit rates to each ranked non-guaranteed bit rate bearer;
allocating, using the at least one weighted proportionally fairness factor and the ranking, at least one resource for transmission of the at least one data packet; and
transmitting, based on the scheduling, the at least one data packet.

2. The method according to claim 1, wherein at least one processor is configured to perform at least one of the determining, the executing, the scheduling, and the transmitting, wherein a base station comprises the at least one processor and at least one memory.

3. The method according to claim 2, wherein the base station is an evolved node B node having a base band unit and a remote radio head.

4. The method according to claim 2, wherein the base station includes at least one of the following: a macro base station, a micro base station, a femto base station, a pico base station, and any combination thereof.

5. The method according to claim 1, wherein the admission control procedure is configured to reserve transmission capacity for at least one of the following: capacity available for non-guaranteed bit rate bearers, capacity available for public non-guaranteed bit rate bearers, capacity consumed by high priority access guaranteed bit rate bearers, capacity consumed by public guaranteed bit rate bearers, capacity reserved for high priority access, and capacity reserved for public use.

6. The method according to claim 1, wherein the admission control procedure is performed based on at least one of the following: a requested bit rate for guaranteed bit rate bearers, minimum bit rate for non-guaranteed bit rate bearers, and minimum bit rate determined based on an allocation and priority information.

7. The method according to claim 1, wherein the scheduling is performed based on an available transmission bandwidth, wherein the available transmission bandwidth is determined based on at least one of the following: available bandwidth for public non-guaranteed bit rate bearers, available bandwidth for non-guaranteed bit rate bearers, consumed bandwidth by public guaranteed bit rate bearers, consumed bandwidth by high priority access guaranteed bit rate bearers, reserved bandwidth for high priority access bearers, and reserved bandwidth for public users.

8. The method according to claim 1, wherein the at least one weighted proportionally fairness factor is determined based on at least one of the following $$oPF_h = \text{Max}(X, A_h/(A_h + A_p))$$

$$oPF_p = \text{Max}(1 - X, A_p/(A_h + A_p))$$

wherein $oPF_h$ is the first factor associated with the bandwidth for non-guaranteed bit rate bearers, and $oPF_p$ is the second associated with the bandwidth for public non-guaranteed bit rate bearers, X is the reserved bandwidth for high priority access bearers, $A_p$ is the available bandwidth for public non-guaranteed bit rate bearers, and $A_h$ is the available bandwidth for non-guaranteed bit rate bearers.

9. The method according to claim 1, further comprising
determining, based on the determined priority of the user equipment, that the user equipment is a non-high priority access user equipment;
transmitting, based on the determined priority of the user equipment, an overload signal from a first base station to a second base station, the non-high priority access user equipment is communicatively coupled with the first base station; and
off-loading the non-high priority access user equipment from the first base station to the second base station.

10. The method according to claim 9, further comprising barring the non-high priority access user equipment from communicating with the first base station based on an access class of the non-high priority access user equipment.

11. A system comprising:
at least one programmable processor; and
a non-transitory machine-readable medium storing instructions that, when executed by the at least one programmable processor, cause the at least one programmable processor to perform operations comprising:
determining a priority level for a user equipment;
executing, based on the determined priority level for the user equipment, an admission control procedure to reserve transmission capacity for the user equipment;
scheduling, based on the determined priority level for the user equipment and the reserved transmission capacity, at least one data packet for transmission to or from the user equipment, the scheduling including
determining at least one weighted proportionally fairness factor using a first factor associated with a bandwidth for non-guaranteed bit rate bearers, and a second factor associated with a bandwidth for public non-guaranteed bit rate bearers, the first and second factors being determined based on at least one of the following: a reserved bandwidth for high priority access bearers, an available bandwidth for public non-guaranteed bit rate bearers, and an available bandwidth for non-guaranteed bit rate bearers;

ranking, using the at least one weighted proportionally fairness factor, non-guaranteed bit rate bearers and assigning bit rates to each ranked non-guaranteed bit rate bearer;

allocating, using the at least one weighted proportionally fairness factor and the ranking, at least one resource for transmission of the at least one data packet; and transmitting, based on the scheduling, the at least one data packet.

12. The system according to claim 11, wherein at least one processor is configured to perform at least one of the determining, the executing, the scheduling, and the transmitting, wherein a base station comprises the at least one processor and at least one memory.

13. The system according to claim 12, wherein the base station is an evolved node B node having a base band unit and a remote radio head.

14. The system according to claim 12, wherein the base station includes at least one of the following: a macro base station, a micro base station, a femto base station, a pico base station, and any combination thereof.

15. The system according to claim 11, wherein the admission control procedure is configured to reserve transmission capacity for at least one of the following: capacity available for non-guaranteed bit rate bearers, capacity available for public non-guaranteed bit rate bearers, capacity consumed by high priority access guaranteed bit rate bearers, capacity consumed by public guaranteed bit rate bearers, capacity reserved for high priority access, and capacity reserved for public use.

16. The system according to claim 11, wherein the admission control procedure is performed based on at least one of the following: a requested bit rate for guaranteed bit rate bearers, minimum bit rate for non-guaranteed bit rate bearers, and minimum bit rate determined based on an allocation and priority information.

17. The system according to claim 11, wherein the scheduling is performed based on an available transmission bandwidth, wherein the available transmission bandwidth is determined based on at least one of the following: available bandwidth for public non-guaranteed bit rate bearers, available bandwidth for non-guaranteed bit rate bearers, consumed bandwidth by public guaranteed bit rate bearers, consumed bandwidth by high priority access guaranteed bit rate bearers, reserved bandwidth for high priority access bearers, and reserved bandwidth for public users.

18. The system according to claim 11, wherein the at least one weighted proportionally fairness factor is determined based on at least one of the following $$oPF_h = \mathrm{Max}(X, A_h/(A_h+A_p))$$

$$oPF_p = \mathrm{Max}(1-X, A_p/(A_h+A_p))$$

wherein $oPF_h$ is the first factor associated with the bandwidth for non-guaranteed bit rate bearers, and $oPF_p$ is the second factor associated with the bandwidth for public non-guaranteed bit rate bearers, X is the reserved bandwidth for high priority access bearers, $A_p$ is the available bandwidth for public non-guaranteed bit rate bearers, and $A_h$ is the available bandwidth for non-guaranteed bit rate bearers.

19. The system according to claim 11, wherein the operations further comprise determining, based on the determined priority of the user equipment, that the user equipment is a non-high priority access user equipment;

transmitting, based on the determined priority of the user equipment, an overload signal from a first base station to a second base station, the non-high priority access user equipment is communicatively coupled with the first base station; and off-loading the non-high priority access user equipment from the first base station to the second base station.

20. The system according to claim 19, wherein the operations further comprise barring the non-high priority access user equipment from communicating with the first base station based on an access class of the non-high priority access user equipment.

21. A computer program product comprising a non-transitory machine-readable medium storing instructions that, when executed by at least one programmable processor, cause the at least one programmable processor to perform operations comprising:

determining a priority level for a user equipment;

executing, based on the determined priority level for the user equipment, an admission control procedure to reserve transmission capacity for the user equipment;

scheduling, based on the determined priority level for the user equipment and the reserved transmission capacity, at least one data packet for transmission to or from the user equipment, the scheduling including determining at least one weighted proportionally fairness factor using a first factor associated with a bandwidth for non-guaranteed bit rate bearers, and a second factor associated with a bandwidth for public non-guaranteed bit rate bearers, the first and second factors being determined based on at least one of the following: a reserved bandwidth for high priority access bearers, an available bandwidth for public non-guaranteed bit rate bearers, and an available bandwidth for non-guaranteed bit rate bearers;

ranking, using the at least one weighted proportionally fairness factor, non-guaranteed bit rate bearers and assigning bit rates to each ranked non-guaranteed bit rate bearer;

allocating, using the at least one weighted proportionally fairness factor and the ranking, at least one resource for transmission of the at least one data packet; and transmitting, based on the scheduling, the at least one data packet.

22. The computer program product according to claim 21, wherein at least one processor is configured to perform at least one of the determining, the executing, the scheduling, and the transmitting, wherein a base station comprises the at least one processor and at least one memory.

23. The computer program product according to claim 22, wherein the base station is an evolved node B node having a base band unit and a remote radio head.

24. The computer program product according to claim 22, wherein the base station includes at least one of the following: a macro base station, a micro base station, a femto base station, a pico base station, and any combination thereof.

25. The computer program product according to claim 21, wherein the admission control procedure is configured to reserve transmission capacity for at least one of the following: capacity available for non-guaranteed bit rate bearers, capacity available for public non-guaranteed bit rate bearers, capacity consumed by high priority access guaranteed bit rate bearers, capacity consumed by public guaranteed bit rate bearers, capacity reserved for high priority access, and capacity reserved for public use.

26. The computer program product according to claim 21, wherein the admission control procedure is performed based on at least one of the following: a requested bit rate for guaranteed bit rate bearers, minimum bit rate for non-guaranteed bit rate bearers, and minimum bit rate determined based on an allocation and priority information.

27. The computer program product according to claim 21, wherein the scheduling is performed based on an available transmission bandwidth, wherein the available transmission bandwidth is determined based on at least one of the following: available bandwidth for public non-guaranteed bit rate bearers, available bandwidth for non-guaranteed bit rate bearers, consumed bandwidth by public guaranteed bit rate bearers, consumed bandwidth by high priority access guaranteed bit rate bearers, reserved bandwidth for high priority access bearers, and reserved bandwidth for public users.

28. The computer program product according to claim 21, wherein the at least one weighted proportionally fairness factor is determined based on at least one of the following $$oPF_h = \mathrm{Max}(X, A_h/(A_h+A_p))$$

$$oPF_p = \mathrm{Max}(1-X, A_p/(A_h+A_p))$$

wherein $oPF_h$ is the first factor associated with the bandwidth for non-guaranteed bit rate bearers, and $oPF_p$ is the second factor associated with the bandwidth for public non-guaranteed bit rate bearers, X is the reserved bandwidth for high priority access bearers, $A_p$ is the available bandwidth for public non-guaranteed bit rate bearers, and $A_h$ is the available bandwidth for non-guaranteed bit rate bearers.

29. The computer program product according to claim 21, wherein the operations further comprise
    determining, based on the determined priority of the user equipment, that the user equipment is a non-high priority access user equipment;
    transmitting, based on the determined priority of the user equipment, an overload signal from a first base station to a second base station, the non-high priority access user equipment is communicatively coupled with the first base station; and
    off-loading the non-high priority access user equipment from the first base station to the second base station.

30. The computer program product according to claim 29, wherein the operations further comprise barring the non-high priority access user equipment from communicating with the first base station based on an access class of the non-high priority access user equipment.

* * * * *